United States Patent [19]
Maier

[11] 3,751,621
[45] Aug. 7, 1973

[54] TRANSFER UNIT FOR AN AUTOMATIC MACHINE FOR THE LARGE-SCALE PRODUCTION OF PARTS COMPRISING TWO WELDED ELEMENTS

[76] Inventor: René Maier, 11, rue d'Huminge, 67 Strasbourg-Neudorf, France

[22] Filed: Mar. 30, 1972

[21] Appl. No.: 239,447

[52] U.S. Cl.................... 219/103, 219/79, 219/156
[51] Int. Cl.......................... B23k 9/04, B23k 11/00
[58] Field of Search.................... 219/103, 104, 156, 219/79

[56] References Cited
UNITED STATES PATENTS
3,456,091  7/1969  Warner.............................. 219/103
3,514,574  5/1970  Forschler........................... 219/103

*Primary Examiner*—J. V. Truhe
*Assistant Examiner*—Hugh D. Jaeger
*Attorney*—William B. Kerkam, Jr.

[57] ABSTRACT

A transfer unit for feeding a continuous line of wire, cutting the wire into segments and welding them to a second element such as a second wire segment which is processed in an identical manner in a second unit mounted opposite to the first.

The unit comprises a horizontal drive shaft mounted in a stationary frame, a coaxial cylinder sleeve secured to the shaft and provided with a plurality of guide grooves forming cams, two independent carriages fitted with roller followers engaged in the guide grooves and displaceable on two superposed parallel slides in reciprocating movements programmed by the grooves, two clamps mounted on the carriage for gripping and feeding the wire in continuous motion, means for cutting the wire into segments and connecting each segment to a voltage source which delivers a welding pulse.

8 Claims, 5 Drawing Figures

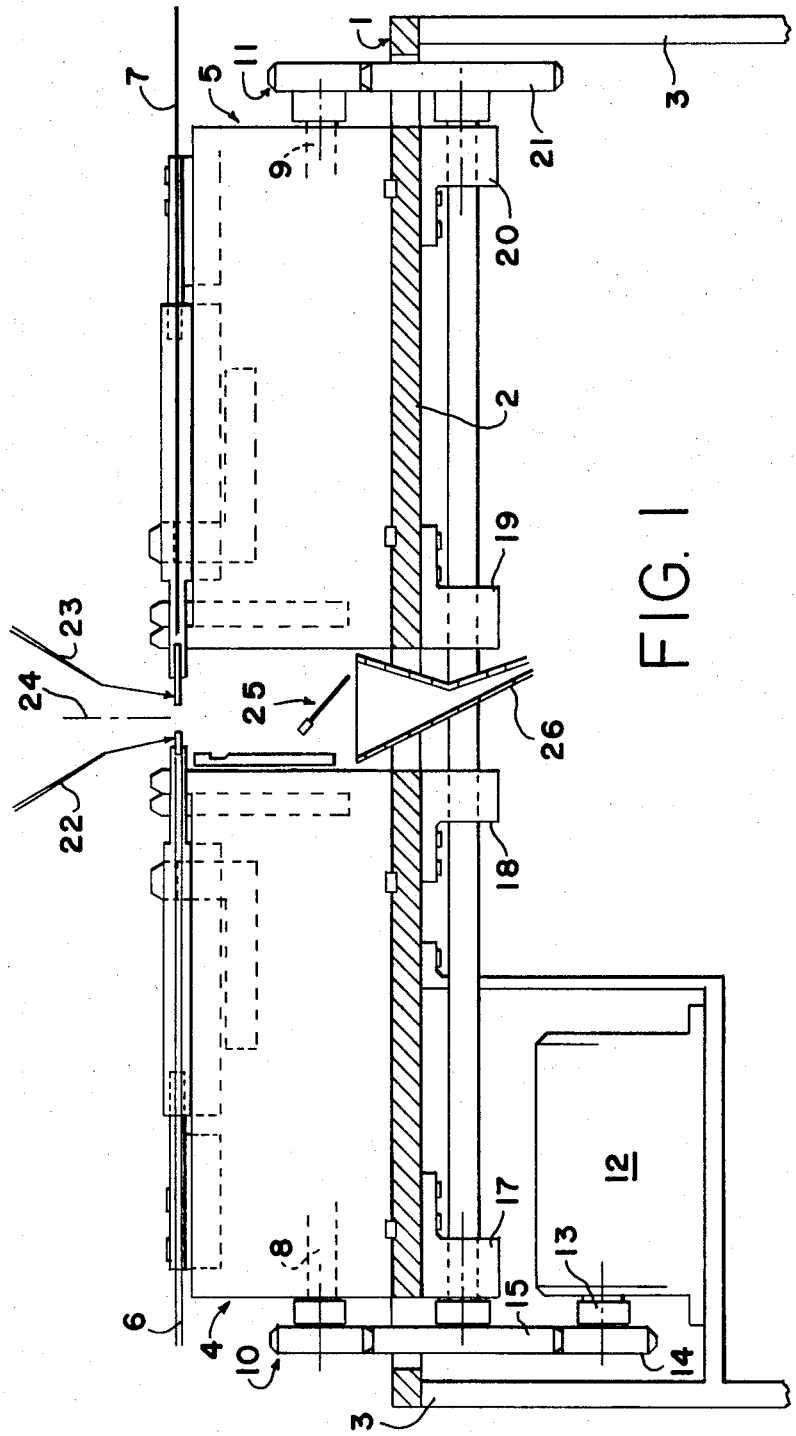

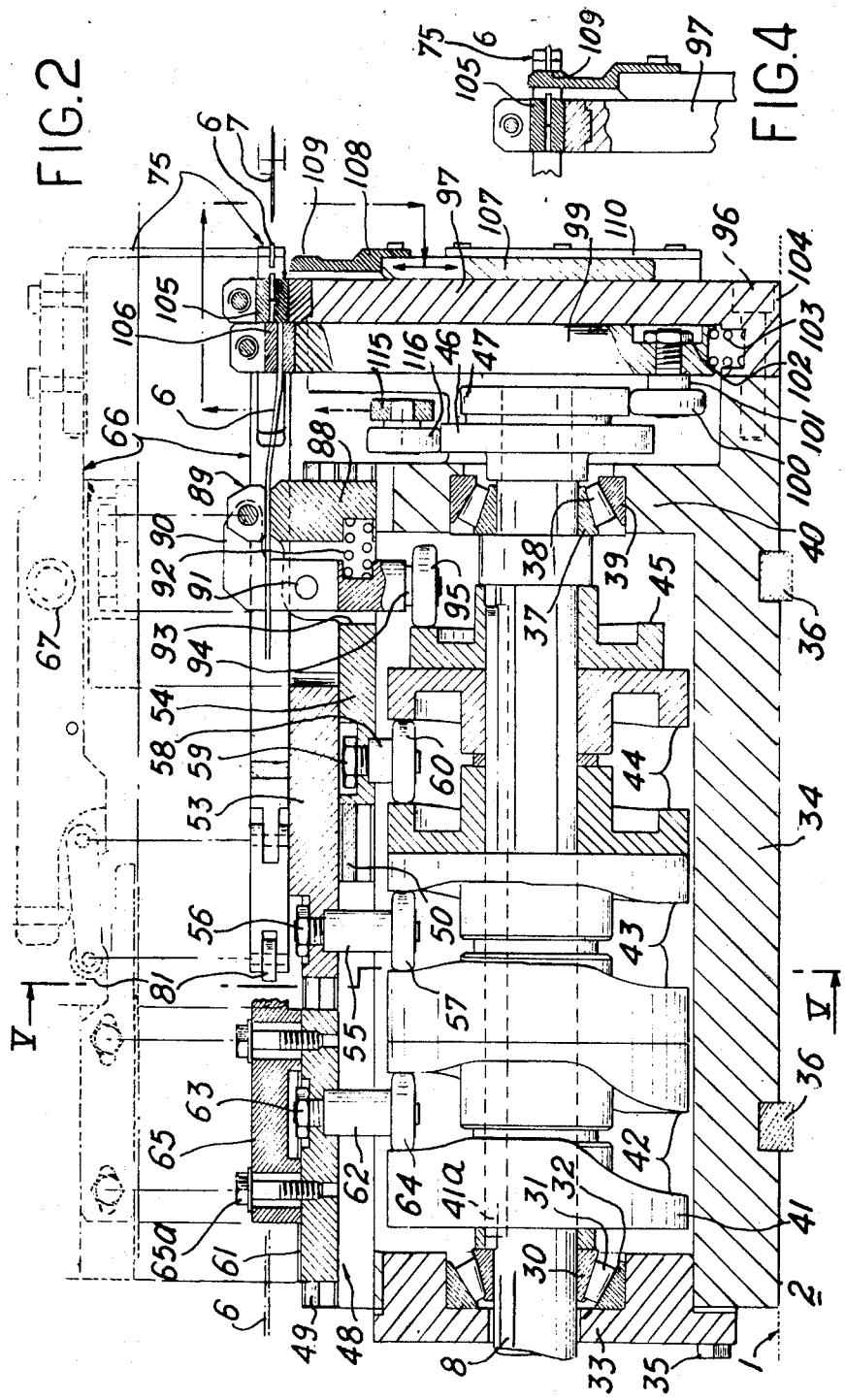

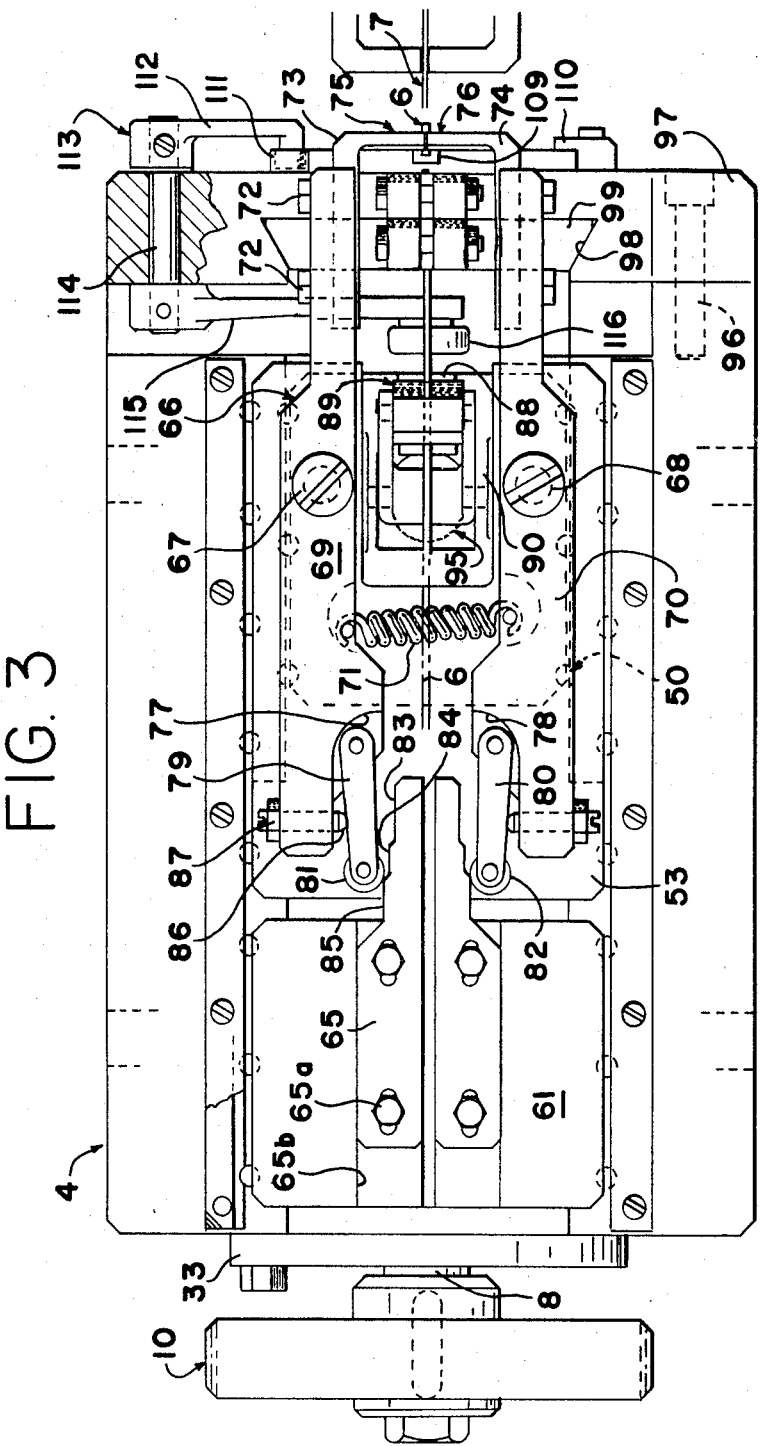

TRANSFER UNIT FOR AN AUTOMATIC MACHINE FOR THE LARGE-SCALE PRODUCTION OF PARTS COMPRISING TWO WELDED ELEMENTS

This invention relates to a transfer unit for an automatic machine in which simple parts comprising mainly two elements welded in end-to-end relation can be mass-produced at a very high speed. By way of example, parts of this type may consist of two segments of wire formed of different metals, whilst a wire and a metal cup forms a support for another element which is subsequently mounted or inset within said cup, such as a transistor, an electric resistor and the like, a small plate or transverse head and an electric lead-wire, and so forth.

The invention is more particularly applicable to the fabrication of components which are usually designated as "pistons" and serve as electric connection members between an electrode of a vacuum tube such as a diode and the exterior of said tube while permitting a leak-tight passage through the wall of this latter. Pistons of this type are usually designed in the form of a first segment of electric wire, especially of copper or other metals such as molybdenum, tungsten, tantalum, having small longitudinal dimensions and constituted by a conductive metallic core and an insulating outer sheath formed, for example, of a borated copper compound, and a second segment of conductive wire having a greater length and formed, for example, either of pure copper or of nickel, these two segments being welded end-to-end in the opposite plane faces thereof which correspond to two transverse sections of the wires constituting said segments.

There are already many known types of machines for manufacturing parts of this type, in which the segments of wires to be welded are obtained continuously from two lines of wires which are delivered from two separate reels, these segments being produced by cutting the lines of wires at the desired length for each segment. These segments are then gripped in clamps which bring them into oppositely-facing relation. An electric pulse generated by a very-high-voltage source at the instant of mutual contact of said segments joins these latter together by means of a resistance weld, the piston thus obtained being immediately ejected in order to permit welding of another piston and so forth, the process being repeated at the highest possible rate.

However, in these machines, the law of motion which is necessary for operation and consists in particular in the accurate distribution in time of the stages of feeding lines of wires, of cutting said wires, of bringing two different segments into the welding position, of welding these segments along their contact faces and of ejecting the pistons obtained, is carried out by means of an assembly of cams carried by at least one shaft which is driven in rotation about its own axis and extends parallel to or at right angles to the lines of wires, said cams being intended to operate actuating levers for initiating the successive mechanical operations. In consequence, said cams always have a positive action on the corresponding levers, the return of these levers in opposition to the action of the cams being effected by means of springs which are usually of substantial length.

In machines designed in accordance with such a concept, it is at once apparent that a limitation is imposed on any increase in production rates, which cannot as a rule exceed 10,000 to 12,000 parts per hour. In point of fact, the inertia of the levers and of the return springs does not permit any increase above this value without causing uncontrolled oscillations of the levers and thus necessarily interrupting production.

The present invention relates to a transfer unit for automatic machines which overcomes the disadvantages referred-to above while permitting the achievement of considerably higher production rates than those of the machines employed up to the present time, especially by eliminating return springs of substantial length which prevent the action of the control cams. This unit makes it possible from a continuous line of wire to ensure the feeding, then the cutting of said wire into segments and finally the welding of said segments to a second element which can in particular be a second segment of wire, said second wire segment being treated in a similar manner in a second unit mounted in the machine opposite to the first.

To this end, the unit under consideration essentially comprises a horizontal drive shaft rotatably mounted in a stationary frame on end-bearings, a cylindrical sleeve coaxial with the shaft and rigidly fixed thereto, a plurality of guide grooves formed in the external surface of the sleeve, a flat and horizontal upper mounting-plate comprising at least two superposed parallel slides for two independent moving carriages, each carriage being provided with a vertical stud fitted with a roller follower engaged in a groove of the sleeve which forms a guiding cam for said roller follower, two clamps for gripping the wire and mounted on the carriages which are driven in reciprocating movements programmed by the guide grooves, said clamps being also alternately opened and closed in opposition to each other in order to cause the continuous progression of the wire within the unit, means for effecting the opening and closing of the clamps in combination with the positional control of the carriages on the slides, a device for cutting the wire into segments having predetermined lengths after said wire has been moved forward by the carriages, and means for connecting each wire segment after cutting to one terminal of an electric voltage source which delivers a welding pulse.

In one particular embodiment of the transfer unit considered, the first carriage supports a first clamp comprising two jaws pivotally mounted on vertical pins carried by the carriage, said jaws being returned to the clamp-opening position by a transverse spring having low inertia, said jaws being provided at one end with wire-clamping noses and at the other end with bearing wheels in contact with stepped guide ramps formed on the lateral faces of a horizontal shoe carried by a thrid carriage, said third carriage being mounted on the same slide as the first carriage and subjected to a reciprocating movement of displacement along the axis of the clamp as obtained by means of a roller follower engaged in another guide groove of the cylindrical sleeve. As an advantageous feature, the stepped guide ramps of the horizontal shoe have three successive and relatively displaced bearing stages in order to determine for the first clamp three positions respectively of opening, pre-closure and closure onto the corresponding wire segment.

In accordance with another characteristic feature, the second clamp carried by the second carriage is constituted by two jaws, one jaw being stationary whilst the second jaw which is movable with respect to the first jaw is pivotally mounted on a horizontal pin carried by the carriage, said two jaws being returned to the position of closure onto the wire by a captive spring mounted between said two jaws, the movable jaw being provided with an end roller follower in cooperating relation with another guide groove of the cylindrical sleeve.

In accordance with yet another characteristic feature, the device for cutting the wire into segments comprises two barrels having horizontal axes and traversed by the wire, one barrel being carried by a stationary frame and the second barrel being carried by a slide-block which is guided within a vertical slide of the stationary frame, said slide-block being driven in a reciprocating movement of displacement controlled by a thrust roller which is carried by a horizontal pin attached to the slide-block and co-operates with a first bearing-cam provided at the end of the cylindrical sleeve in opposition to the action of a restoring spring mounted between said slide-block and a horizontal flange of the stationary frame.

Finally and in accordance with further characteristic features, the means for connecting each cut wire segment to one terminal of an electric voltage source can be constituted as the case may be and as a function of the nature of the wire employed, either by a direct connection with at least one of the jaws of the first clamp in the position of closure against the wire segment or by means of an axial contact electrode engaged behind the wire segment, said electrode being carried by a second slide-block movable within a vertical slide of the stationary frame under the action of a second thrust roller in contact with a second bearing-cam carried by the cylindrical sleeve. Preferably, the two slide-blocks carried by the stationary frame are movable within parallel slides formed in opposite vertical faces of said frame which extend at right angles to the longitudinal axis of the wire, the thrust roller of the second slide-block being carried by a U-shaped counter-motion yoke which is pivoted on the stationary frame about a horizontal shaft, the two arms of the yoke being parallel to the two faces of the frame.

Further characteristic features of a transfer unit for a production machine according to the invention will become apparent from the following description of one example of construction which is given by way of indication without any intended limitation, reference being made to the accompanying drawings, wherein:

FIG. 1 is a diagrammatic view in elevation showing a machine comprising two transfer units placed in oppositely-facing relation for the manufacture of elements formed of two segments of different wires welded in end-to-end relation;

FIG. 2 is a transverse sectional view with a revolved presentation of its upper portion and showing one of the two units employed in the construction of the machine in accordance with FIG. 1;

FIG. 3 is a top view of the unit illustrated in FIG. 2;

FIG. 4 is a view which shows a detail of FIG. 2 to a slightly larger scale and illustrates more especially an alternative form of construction of the electric connection means which are incorporated in the unit;

Figure 5:
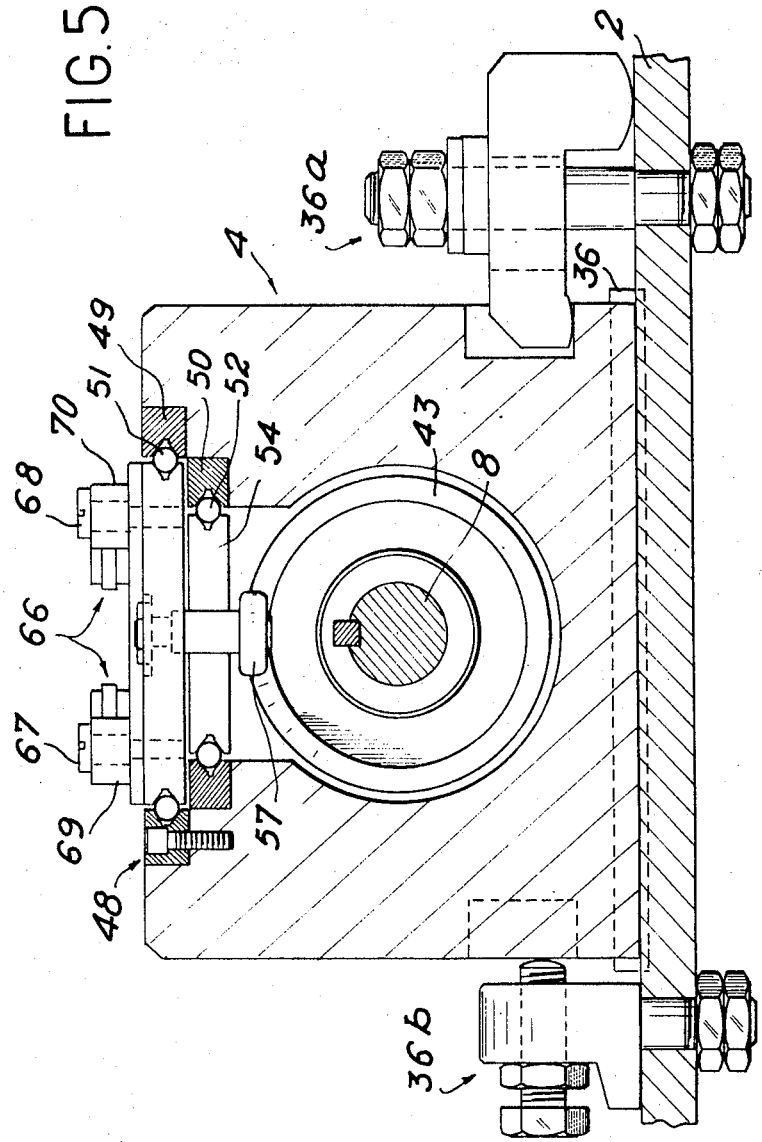
FIG. 5 is a transverse sectional view taken along line V—V of FIG. 2 and showing in particular the slides which are provided for permitting relative displacements of the carriages of the machine.

In the example which is described hereinafter, the machine under consideration is so arranged as to permit high speed mass production of elements in two parts which are welded in end-to-end relation, each of these parts being constituted by a segment of wire, one segment being conductive and formed of copper, nickel or iron whilst the other segment which is smaller in length is formed of a nickel or copper core covered with an insulating sheath of borated copper, for example.

In FIG. 1, the reference numeral 1 designates the frame which supports the machine and mainly comprises a horizontal table 2 which is supported on the ground by legs 3. There are mounted on said table 2 in oppositely-facing relation, two units 4 and 5 in accordance with the invention, these units being designed respectively to carry out the feeding, cutting, suitable presentation and finally welding of the wire segments forming the fabricated element in pairs, said segments being obtained from lines of wires 6 and 7 which are continuously delivered from supply reels (not shown in the drawings). The two units 4 and 5 comprise horizontal driving shafts 8 and 9 provided at their opposite extremities with driving pinions 10 and 11. Synchronous driving in rotation of the shafts 8 and 9 is effected from a single electric motor 12 and the output shaft 13 of this latter carries a pinion 14 which in turn meshes with a transmission ring 15 disposed directly in mesh with the pinion 10, said ring 15 being also keyed on a horizontal countershaft 16 which extends parallel to the table 2 while being guided beneath this latter by means of bearings 17, 18, 19 and 20. At the end remote from the ring 15, the shaft 16 is keyed on a second ring 21 which is in turn disposed in mesh with the end pinion 11 of the shaft 9.

In order to effect the welding of the wire segment, the two units 4 and 5 are connected to electric lead-wires 22 and 23 which are so arranged as to apply a pulse of short duration and of very high power to the wire segments which are derived from the lines 6 and 7, said pulse being produced exactly at the time of contact of the two wire segments along the mid-plane 24 of the machine so that resistance welding of these two segments can thus be carried out in a conventional manner. The part which is obtained as shown diagrammatically at 25 is then ejected and recovered in a hopper 26 for discharge to a suitable storage station.

FIG. 2 illustrates in detail and to a larger scale the particular construction of one of the two units of the machine, especially the unit shown on the left-hand side of FIG. 1 and designated by the reference numeral 4. The drive shaft 8 extends horizontally above the table 2 and is provided at the end located on the left-hand side with an inner bearing-ring 30 for a tapered roller-bearing 31 which co-operates with an outer bearing-ring 32, said outer ring being in turn mounted within a bearing-bush 33 which is rigidly fixed to a lower mounting-plate 34 by means of screws 35. The mounting-plate 34 is in turn supported on the table 2 of the frame 1 of the machine by means of keys 36 which serve to modify the lateral position of the unit 4 and also its longitudinal position if necessary in order to adjust the lines of wires 6 and 7 with respect to each other. Clamping and aligning assemblies 36a and 36b are adapted to cooperate with the keys 36 and are illustrated diagrammatically in FIG. 5. At the end located on the right-hand side of FIG. 2, the shaft 8 is rigidly fixed to a second inner bearing-ring 37 for another tapered roller-bearing 38 which cooperates with an outer bearing-ring 39 carried by a second bearing-bush 40 which is parallel to the first bearing-bush 33 and is rigidly fixed to the bottom mounting-plate 34.

In accordance with the invention, the shaft 8 supports a cylindrical sleeve 41 which is formed of a plurality of adjacent sections, which extends coaxially with the shaft and is locked on this latter by means of a longitudinal key 41a. Said sleeve is provided in its outer surface with a series of separate guide grooves, each groove being formed around the entire periphery of the sleeve 41 so as to constitute a cam in the form of a guide track having a predetermined profile. These grooves, which are three in number in the example described and illustrated in the drawings, are designated from left to right by the references 42, 43 and 44. The sleeve 41 has a portion 45 which is completely open towards the exterior at that extremity of said sleeve which is directed towards the bearing-bush 40. In the same manner as the grooves referred-to above, said portion performs the function of a guiding cam for a roller follower 95, the intended function of which will be explained in greater detail below. Finally, beyond the bearing-bush 40 on the right-hand side, the shaft 8 is rigidly fixed to two further cams in the form of flat discs having suitably designed external profiles.

The unit 4 is provided on the side opposite to the first mounting-plate 34 with a second horizontal mounting-plate 48 which is located above the sleeve 41 and the discs 46 and 47. As also shown in the transverse sectional view of FIG. 5, said mounting-plate 48 comprises two guide shoes forming slides 49 and 50 for balls 51 and 52 which support two superposed and independent carriages designated respectively by the references 53 and 54.

The first carriage 53 comprises a vertical stud 55 extending at right angles beneath this latter and locked by means of a nut 56. The opposite end of said stud terminates in a roller follower 57 which is engaged within one of the guide grooves of the sleeve 41, and especially in the central groove 43.

Similarly, the second carriage 54 which is located beneath the first comprises a vertical stud 58 which is locked by means of a nut 59 and extended by a roller follower 60, said follower being engaged within the guide groove 44 which is located on the right-hand side of the groove 43.

Finally, a third carriage 61 is mounted behind the first carriage 53 on the balls 51 of the slide 49. In the same manner as the two other carriages, said carriage 61 is fitted with a vertical stud 62 locked by means of a nut 63 and terminating in a roller follower 64 which is engaged in the third guide groove 42 of the sleeve 41. Under these conditions, rotational motion of said sleeve results in simultaneous and coordinate displacement of the three carriages 53, 54 and 61 along their respective slides, in reciprocating movements determined by the profiles of the guide grooves 43, 44 and 42 which cooperate with the roller followers 57, 60 and 64; these movements make it possible to ensure continuous feed of the wire 6 within the unit at a rate of production of the element which is determined by the speed of rotation of the shaft 8.

To this end and as shown more clearly in FIG. 3, the third carriage 61 comprises a push-plate or shoe 65 which is mounted axially and rigidly fixed to the carriage by means of locking screws 65a. Said shoe is intended to produce action in the direction of opening or closure on a first clamp 66 which is mounted on the first carriage 53 and so arranged as to grip the wire 6 which passes axially through the transfer unit and in particular through the shoe 65 within an axial groove 65b formed in this latter. Said clamp 66 comprises two jaws 69 and 70 which are pivoted about two vertical pins 67 and 68 carried by the carriage and continuously urged towards each other by means of a small transverse spring 71 having very low inertia. The jaws 69 and 70 are provided with heels at the end remote from said spring with respect to the pivot-pins 67 and 68 and with clamping noses 73 and 74 which are secured to said jaws by means of screws 72. Said noses are so arranged that the wire 6 is gripped between the extremities 75 and 76 of the noses in the position of maximum closure of these latter in order that the displacement of the carriage 63 which is accompanied by the clamp 66 should carry out the feeding of said wire with the same amplitude in conjunction with said clamp.

Accordingly, in order to effect the opening and closure of the jaws 69 and 70, these latter are provided at the ends opposite to the noses 73 and 74 with annular recesses 77 and 78 for the pivotal attachment of said jaws to levers 79 and 80 terminating in bearing rollers 81 and 82 which are capable of coming simultaneously into contact with stepped guide ramps designated respectively by the references 83, 84 and 85, and formed in the shoe 65 of the third carriage 61. Depending on the relative positions of the carriages 53 and 61, that is to say according to the position of the shoe 65 between the jaws 69 and 70, one of the three ramps 83, 84 or 85 will accordingly produce action on the bearing rollers 81 and 82 in opposition to the restoring spring 71 in order to bring the noses 73 and 74 either to the opening position, the pre-closure position or the opening position with respect to the wire 6. Suitable positional adjustment of the jaws, especially in order to prevent flattening of the wire, is carried out beforehand by means of adjustable stops 86 which are displaced by means of nuts 87.

The second carriage 54, which is capable of sliding along the guide 50 beneath the carriages 53 and 61, is provided with a flange 88 located at the right-hand extremity of said carriage as shown in the drawing. Said flange constitutes one of the horizontal clamping jaws of a second clamp 89 which is located between the jaws 69 and 70 of the first clamp 66 but is separate from this latter, whilst the other jaw 90 is pivoted about a horizontal pin 91 carried by said carriage. The two jaws 88 and 90 of the second clamp 89 are normally thrust towards each other in order that the wire 6 may be gripped between them by virtue of a captive spring 92 housed between said two jaws, a slot 93 being formed in the carriage 54 so as to permit relative displacement of the movable jaw 90. Said jaw 90 is provided at its lower end with an extension stud 94, a roller follower 95 being mounted thereon and applied against the open portion 45 forming a cam which is provided at the end of the sleeve 41.

The unit herein described is then completed by means of a device which makes it possible, in dependence on the feed movements of the wire 6 produced by the clamps 66 and 89 which are in turn controlled in conjunction with the alternate displacement of the carriages 53, 54 and 61, to cut the wire into segments of predetermined length according to the characteristics of the element 25 to be fabricated which, as stated earlier, comprises two elements or segments of wires to be welded end-to-end. To this end, the bottom mounting-plate 34 is rigidly fixed by means of screws 96 to a stationary auxiliary frame 97 (shown in FIG. 2) which extends vertically and at right angles to the line of wire 6. A slideway 98 having a dovetail section (as shown in FIG. 3) is machined in that face of the frame 97 which is directed towards the sleeve 41, said slideway being adapted to carry a slide-block 99 which is driven in a reciprocating movement of displacement by means of a roller follower 100 carried by a transverse spindle 101 which is locked by means of a nut 102. Said roller follower cooperates by direct contact with the cam-disc 47 which is mounted at the end of the drive shaft 8. A captive spring 103 which is disposed between the slide-block 99 and a flat bottom flange 104 of the stationary frame 97 continuously urges the slide-block 99 in the upward direction in opposition to the action produced by said cam-disc 47.

The upper portion of the stationary frame 97 is fitted with a fixed barrel 105 consisting of a small tube of material having a high degree of hardness such as tungsten carbide, for example, and provided with an axial bore having a diameter which is only slightly larger than that of the wire 6 which passes through said bore. The slide-block 99 is also fitted with a barrel 106 which is similar to the barrel 105 and normally located in register on the same axis as long as the cam-disc 47 does not cause said slide-block to move downwards within its slideway 98, the effect of such downward motion being to produce rapid cutting of the wire 6 as shown in FIG. 2. The slide-block 99 then returns to the initial position in which the barrels 105 and 106 are in axially coincident relation; a further forward displacement of the wire within said barrels thrusts forward the segment which has just been cut and which, at the outlet of the barrel 105, is taken by the noses of the clamp 66 and brought by this latter into the welding position.

Two cases can then be envisaged, depending on whether or not the wire 6 is designed in the form of an element having an electrically conductive outer surface.

In this first case, which is the most simple, the supply of current to the wire segment which passes out of the barrel 105 can be effected directly through the extremities 75 and 76 of the noses 73 and 74 of the jaws 69 and 70 of the clamp 66, said extremities being in turn connected to the voltage source by means of the lead-wire 22 (shown in FIG. 1).

On the contrary, in the second case referred-to and especially when the wire 6 is covered with an insulating sheath, it is necessary to conduct the current through the core of the wire, that is to say along the axis of the segment which passes out of the barrel 105 and which is taken by the noses of the jaws of the clamp 66. To this end, the frame 97 is adapted to support a second slide-block 107 in that face which is opposite to the slideway 98, said slide-block being fitted with a head 108 which terminates in an electrode 109 (shown in FIG. 4). The shape of said electrode 109 (shown in FIG. 4). The shape of said electrode enables it to slide behind the thread segment which has been taken between the extremities 75 and 76 of the noses 73 and 74 of the clamp 66 and to come into contact with said segment on the rear face of this latter with respect to the direction of feed of the wire within the unit. This second slide-block 107 which is guided in its movements of displacement by means of a rail 110 fixed on the frame 97, is subjected to a reciprocating vertical movement by means of a runner-wheel 111 mounted at the extremity of one of the arms 112 of a U-shaped yoke 113, said yoke being pivoted about a transverse shaft 114 on the stationary frame 97. The second arm 115 of the yoke in turn terminates in a roller follower 116 which is in contact with the second cam-disc 46 mounted at the end of the drive shaft 8.

The operation of the transfer unit cosidered can now be readily deduced from the foregoing description. The line of wire 6 which passes axially through the unit is gripped in a first stage between the jaws 88 and 90 of the second clamp 89 which is carried by the second carriage 54. The axial displacement of said second carriage along the slide 50 under the action of the roller follower 60 which is engaged within the guide groove 44 of the sleeve 41, is accompanied by said clamp 89 and therefore causes the forward displacement of the wire 6 over a distance equal to the maximum amplitude of the movement of the carriage. In this first stage, the wire 6 passes freely through the two barrels 105 and 106 of the frame 97 and of the first slide-block 99 which are placed in oppositely facing relation. At the end of displacement of the carriage 54, rapid cutting of the wire takes place along the plane of contact of the two barrels as a result of operation of the slide-block 99 within its slideway 98 under the action of the cam-disc 47; immediately thereafter, said slide-block returns to its initial position so as to bring back the barrel 106 in the axis of the barrel 105. The wire segment which has thus been cut remains within the barrel 105 until it is pushed by the following segment in the direction of forward motion of the wire, that is to say from the left towards the right in FIGS. 2 and 3, and so forth as each new cycle takes place.

Under these conditions, the wire segment which passes out at the instant considered towards the right-hand side of the stationary barrel 105 is gripped by the noses 73 and 74 of the first clamp 66. To this end, said clamp which brings its noses into position immediately behind the barrel 105, is first brought into the position of pre-closure in which the clamp jaws 69 and 70 are slightly separated under the action of the spring 71, the bearing rollers 81 and 82 being respectively in contact with the corresponding intermediate guide ramp 84 provided on each side of the shoe 65; in this position, the extremities 75 and 76 of the noses 73 and 74 effect only the guiding of the wire segment which passes out of the barrel 105 and which therefore engages freely within said noses without any danger of jamming.

In order to permit subsequent closure of the clamp 66 and the bringing-together of the noses 73 and 74 against the wire segment which has been introduced therein, the third carriage 61 moves towards the right-hand side along the slide 49 under the action of the roller follower 64 which is engaged within the guide groove 42; the bearing rollers 81 and 82 which are associated with the jaws 69 and 70 are thus transferred from the guide ramp 84 to the guide ramp 85, thereby causing the pivotal motion of said jaws about their pins 67 and 68 in the appropriate direction. The wire 6 which is thus gripped within the extremities 75 and 76 of the noses 73 and 74 is then passed out of the fixed barrel 105 and brought into position by the clamp 66 in readiness for welding. To this end, the assembly formed by the two carriages 53 and 61 is displaced towards the right, the roller followers 57 and 64 being constrained to follow paths having strictly the same profile within the corresponding guide grooves 42 and 43. At the end of travel, the wire segment is ready to be welded to the corresponding segment which is formed simultaneously on the line of wire 7 by the second unit 5 which is placed opposite to the first (as shown in FIG. 1).

In the case contemplated earlier, in which the wire 6 itself is conductive, the necessary welding pulse can be delivered directly to the corresponding segment by means of one of the jaws 69 or 70 of the clamp 66 which is connected to the voltage source by means of the flexible lead-wire 22. Thus, the contact made between the two segments of wire 6 and 7 produces an electric discharge which is adapted to immediate welding of these two elements.

In the other case in which the segment 6, for example, is covered with an insulating sheath, use is made of the electrode 109 which is carried by the second slide-block 107 and connected to the voltage source by means of the lead-wire 22. Under the action of the cam-disc 46, of the roller follower 116 and of the mechanical counter-motion system constituted by the yoke 113, said electrode is brought into position behind the wire segment 6 and applied in contact with the conductive core of this latter. The impact produced on the first wire segment 6 by the second segment 7 which is brought by the second unit 5 ensures adequate electric connection with the electrode 109 in all cases, welding between the two segments being then performed as before. Once the weld has been completed, the carriage 61 moves back towards the left along the slide 49 (see FIGS. 2 and 3), thus transferring the bearing rollers 81 and 82 from the guide ramp 85 to the guide ramp 83 while permitting opening of the noses 73 and 74 of the jaws 69 and 70 of the clamp 66 under the action of the spring 71. Since the same operation takes place at the same time within the second unit, the element 25 which is formed by the two welded wire segments is automatically released and discharged through the hopper 26 from which it falls solely under the action of gravity or, if necessary, by being blown therethrough by means of a jet of air produced though a nozzle (not shown in the drawing).

At the same time as the preceding operations, the opening of the second clamp 89 carried by the carriage 54 has taken place as a result of pivotal motion of the jaw 90 about the pin 91, this pivotal motion being controlled by the follower 95 which rolls on the cam surface 45 of the extremity of the sleeve 41. While the clamp 89 remains open, the carriage 54 withdraws along its slide 50 towards the left-hand side of the drawing (FIGS. 2 and 3) in order to lay a further length of wire on the upstream side. In fact, the clamp 89 closes onto the line of wire 6 at the end of travel and the displacement of the carriage 54 in the opposite direction repeats the wire-feed operations which have already been described. At the same time, after opening and ejection of the welded part 25, the first clamp 66 also withdraws towards the left-hand side of the drawing together with the carriages 53 and 61 in identical movements of displacement until the extremities 75 and 76 of the noses 73 and 74 are brought back in front of the outlet of the barrel 105. Since the carriage 53 then remains stationary, a final displacement of the carriage 61 in the opposite direction brings the bearing rollers 81 and 82 of the jaws 69 and 70 onto the intermediate ramp 84; in this position, the noses 73 and 74 revert to their position of pre-closure.

The cycle of mechanical operations can then resume at a very high rate, directly as a function of the speed of rotation of the drive shafts 8 and 9 (shown in FIG. 1), that is to say of the driving motor 12. The only springs 71, 92 and 103 which are employed in the transfer unit are springs having very low inertia which can permit the extremely rapid reciprocating movements of the components between which they are mounted without any danger of uncontrolled oscillations. This accordingly results in a considerably higher production potential than was the case with machines available heretofore.

A further advantage of the invention arises from the practical application of standardized transfer units which permit all the necessary mechanical functions, some of which may be either suppressed or modified if necessary without having any influence on the other functions. In particular and as has already been mentioned, the assembly of a second slide-block which carries an electrode for axial supply of current to the wire segments is necessary only if the wire is provided with an external insulating sheath. By way of alternative, it would be possible to replace this electrode by a knife blade adapted to cooperate with a fixed barrel in order to cut the lines of wire into segments of suitable length by means of a slightly different method. Similarly, one of the two transfer units within the machine could readily be replaced by any other system of a type known per se for presenting one of the two elements to be welded such as, for example, a cup, a small plate, a thimble and the like, whilst the other element remains in the form of a wire segment which is delivered from the transfer unit and welded to the other element.

It follows from the foregoing that the invention must not be considered as being limited to the exemplified embodiment which has been more especially described with reference to the drawings but extends, on the contrary, to all alternative forms.

What we claim is:

1. A transfer unit for an automatic machine for the large-scale manufacture of parts comprising two welded elements, especially two segments of wires, comprising a horizontal drive shaft rotatably mounted in a stationary frame on end-bearings, a cylindrical sleeve coaxial with the shaft and rigidly fixed thereto, a plurality of guide grooves formed in the external surface of the sleeve, a flat and horizontal upper mounting-plate comprising at least two superposed parallel slides for two independent moving carriages, each carriage being provided with a vertical stud fitted with a roller follower engaged in a groove of the sleeve which forms a guiding cam for said roller follower, two clamps for gripping the wire and mounted on the carriages which are driven in reciprocating movements programmed by the guide grooves, said clamps being also alternately opened and closed in opposition to each other in order to cause the continuous progression of the wire within the unit, means for effecting the opening and closing of clamps in combination with the positional control of the carriages on the slides, a device for cutting the wire into segments having predetermined lengths after said wire has been moved forward by the carriages, and means for connecting each wire segment after cutting to one terminal of an electric voltage source which delivers a welding pulse.

2. A transfer unit according to claim 1, wherein the first carriage supports a first clamp comprising two jaws pivotally mounted on vertical pins carried by the carriage, said jaws being returned to the clamp-opening position by a transverse spring having low inertia, said jaws being provided at one end with wire-clamping noses and at the other end with bearing wheels in contact with stepped guide ramps formed on the lateral faces of a horizontal shoe carried by a third carriage, said third carriage being mounted on the same slide as the first carriage and subjected to a reciprocating movement of displacement along the axis of the clamp as obtained by means of a roller follower engaged in another guide groove of the cylindrical sleeve.

3. A transfer unit according to claim 2, including three successive and relatively displaced bearing stages for the guide ramps providing the first clamp with three positions respectively of opening, pre-closure and closure onto the corresponding wire segment.

4. A transfer unit according to claim 1, wherein the second clamp carried by the second carriage is constituted by two jaws, one jaw being stationary while the second jaw which is movable with respect to the first jaw is pivotally mounted on a horizontal pin carried by the carriage, said two jaws being returned to the position of closure onto the wire by a captive spring mounted between said jaws, the movable jaw being provided with an end roller-follower in cooperating relation with another guide groove of the cylindrical sleeve.

5. A transfer unit according to claim 1, wherein the device for cutting the wire into segments comprises two barrels having horizontal axes and traversed by the wire, one barrel being carried by a stationary frame and the second barrel being carried by a slide-block which is guided within a vertical slide of the stationary frame, said slide-block being driven in a reciprocating movement of displacement controlled by a thrust roller which is carried by a horizontal pin attached to the slide-block and cooperates with a first bearing-cam provided at the end of the cylindrical sleeve in opposition to the action of a restoring spring mounted between said slide-block and a horizontal flange of the stationary frame.

6. A transfer unit according to claim 1, wherein the means for connecting each cut wire segment to one terminal of an electric voltage source are constituted by a direct connection with at least one of the jaws of the first clamp in the position of closure against the wire segment.

7. A transfer unit according to claim 8, wherein the two slide-blocks carried by the stationary frame are movable within parallel slides formed in opposite vertical faces of said frame which extend at right angles to the longitudinal axis of the wire, the thrust roller of the second slide-block being carried by a U-shaped counter-motion yoke which is pivoted on the stationary frame about a horizontal shaft, the two arms of the yoke being parallel to the two faces of the frame.

8. A transfer unit according to claim 1 wherein the means for connecting each cut wire segment to one terminal of an electric voltage source are constituted by an axial contact electrode engaged behind the wire segment, said electrode being carried by a second slide-block which is movable within a vertical slide of the stationary frame under the action of a second thrust roller which is in contact with a second bearing-cam carried by the cylindrical sleeve.

* * * * *